US008552988B2

(12) United States Patent
Battles et al.

(10) Patent No.: US 8,552,988 B2
(45) Date of Patent: Oct. 8, 2013

(54) VIEWING DEVICE HAVING A TOUCH PAD

(75) Inventors: Amy E. Battles, Windsor, CO (US);
Norman Conrad Pyle, Greeley, CO (US); Mark John Bianchi, Fort Collins, CO (US); Daniel J. Byrne, Fort Collins, CO (US); Shanshan Li, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1915 days.

(21) Appl. No.: 11/262,584

(22) Filed: Oct. 31, 2005

(65) Prior Publication Data

US 2007/0097086 A1 May 3, 2007

(51) Int. Cl.
*G06F 3/041* (2006.01)

(52) U.S. Cl.
USPC .................. 345/173; 345/174; 178/18.01

(58) Field of Classification Search
USPC ......... 345/173, 156, 159, 163, 184, 622, 719,
345/810; 725/38; 348/207.99, 208.15;
348/333.01; 358/474; 705/9; 707/104.1
See application file for complete search history.

(56) References Cited

U.S. PATENT DOCUMENTS

| | | | | |
|---|---|---|---|---|
| 5,729,673 A * | 3/1998 | Cooper et al. | ................ | 345/427 |
| 5,923,908 A * | 7/1999 | Schrock et al. | ................ | 396/85 |
| 6,690,365 B2 * | 2/2004 | Hinckley et al. | ............... | 345/173 |
| 6,919,927 B1 * | 7/2005 | Hyodo | ..................... | 348/333.02 |
| 7,209,149 B2 * | 4/2007 | Jogo | ............................. | 345/622 |
| 7,471,284 B2 * | 12/2008 | Bathiche et al. | ............... | 345/184 |
| 2002/0118169 A1 * | 8/2002 | Hinckley et al. | ............... | 345/163 |
| 2002/0158852 A1 * | 10/2002 | Mori et al. | ..................... | 345/173 |
| 2002/0176016 A1 * | 11/2002 | Misawa et al. | ........... | 348/333.01 |
| 2002/0186234 A1 * | 12/2002 | Van De Streek et al. | ...... | 345/719 |
| 2002/0191029 A1 * | 12/2002 | Gillespie et al. | ............... | 345/810 |
| 2003/0076301 A1 * | 4/2003 | Tsuk et al. | ..................... | 345/159 |
| 2003/0093790 A1 * | 5/2003 | Logan et al. | ..................... | 725/38 |
| 2003/0182170 A1 * | 9/2003 | Meunitz | ............................ | 705/9 |
| 2003/0214684 A1 * | 11/2003 | Kuboki | ......................... | 358/474 |
| 2004/0125074 A1 * | 7/2004 | Lin | ............................... | 345/156 |
| 2004/0128317 A1 * | 7/2004 | Sull et al. | .................... | 707/104.1 |
| 2004/0224638 A1 * | 11/2004 | Fadell et al. | ................. | 455/66.1 |
| 2005/0117024 A1 * | 6/2005 | Lee | ............................ | 348/208.15 |
| 2005/0122401 A1 * | 6/2005 | Horie | ........................ | 348/207.99 |
| 2005/0156901 A1 * | 7/2005 | Ma et al. | ........................ | 345/173 |
| 2005/0198590 A1 * | 9/2005 | Jarrett et al. | ................... | 715/863 |
| 2005/0219555 A1 * | 10/2005 | Onuma et al. | ................. | 358/1.1 |
| 2006/0028454 A1 * | 2/2006 | Branton et al. | ............... | 345/173 |
| 2006/0291717 A1 * | 12/2006 | Mussack et al. | .............. | 382/154 |

OTHER PUBLICATIONS

Synaptics, Portable Music Player User Interface Concepts, manual, May 27, 2005, Part No. 507-000013-01 Rev. A, San Jose, CA.

(Continued)

*Primary Examiner* — Amare Mengistu
*Assistant Examiner* — Premal Patel

(57) ABSTRACT

Viewing devices are disclosed herein. One embodiment of a viewing device is a digital camera having at least one function. And embodiment of the digital camera comprises a touch pad, wherein in which a stylus that is moved relative to the touch pad is detectable by the digital camera. The speed at which the function is performed corresponds to the speed that the stylus is moved relative to the touch pad.

7 Claims, 2 Drawing Sheets

(56) References Cited

OTHER PUBLICATIONS

U.S. Appl. No. 11/262,585, filed Oct. 31, 2005 for "Digital Camera Having a Touch Pad" of Amy E. Battles et al.
U.S. Appl. No. 11/263,417, filed Oct. 31, 2005 for "Imaging Device Scrolling Touch Pad with Tap Points" of Amy E Battles.
U.S. Appl. No. 11/263,630, filed Oct. 31, 2005 for "Digital Camera User Interface" of Amy E Battles.
U.S. Appl. No. 11/262,565, filed Oct. 31, 2005 for "Digital Camera User Interface" of Amy E Battles et al.
U.S. Appl. No. 11/263,422, filed Oct. 31, 2005 for "Imaging Device Control Using Touch Pad" of Amy E Battles.

* cited by examiner

VIEWING DEVICE HAVING A TOUCH PAD

U.S. Patent Application Ser. No. 10/846,455, of Amy E. Battles, filed on the same day as this application; U.S. Patent Application Ser. No. 11/263,630, of Amy E. Battles, filed on the same day as this application; U.S. Patent Application Ser. No., 11/262,585, of Amy E. Battles, Daniel J. Byrne, Shanshan Li, and Norman C. Pyle filed on the same day as this application; U.S. Patent Application Ser. No. 11/262,565, of Amy E. Battles, Shanshan Li, and Norman C. Pyle filed on the same day as this application; U.S. patent application Ser. No. 11/263,422, of Amy E. Battles filed on the same day as this application, are all hereby incorporated by reference for all that is disclosed therein. Cross reference is also made to U.S. patent application Ser. No. 11/262,701, of Amy E. Battles, Jason Yost, and John A. Mick, filed on the same day as this application.

BACKGROUND

As digital viewing devices become more complex and include more features, more buttons and the like are required to operate these features. As the digital viewing technology improves, digital viewing devices are being made smaller. The combination of smaller digital viewing devices and more features results in small digital viewing devices that require a large number of buttons. Thus, digital viewing devices have a plurality of buttons and the like located in a small area, which can make the operation of the digital viewing devices cumbersome.

DETAILED DESCRIPTION

Various embodiments of digital viewing devices, such as digital cameras are disclosed herein. The viewing devices include various embodiments of touch pads that enhance the operation of the viewing devices. For illustration purposes, the viewing devices are described herein as being digital cameras having displays located thereon. Some embodiments of the display devices, such as digital cameras, may capture still images and/or video clips and display the still images and/or video clips.

Figure 1:
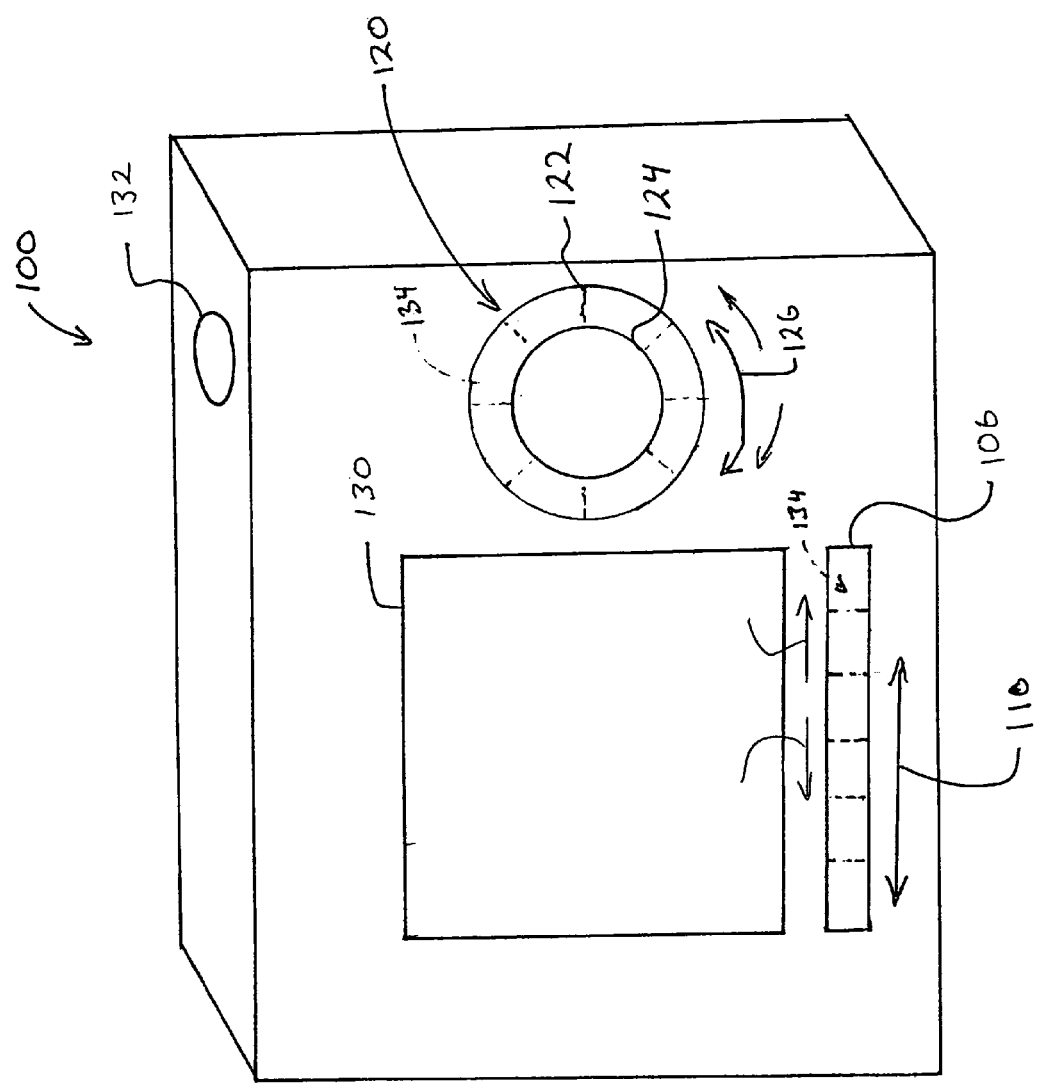
FIG. 1 is a rear perspective view of a digital camera having linear touch pads located thereon.

An embodiment of a digital camera 100 is shown in FIG. 1. The digital camera 100 has a linear touch pad 106 located thereon. The linear touch pad 106 is referred to as a linear touch pad, meaning that movements of a stylus in a linear direction along the axis 110 are detected by the linear touch pad 106. In some embodiments, the linear movement of the stylus is detected by software or firmware associated with the linear touch pad 106. For description purposes, the linear touch pad 106 will be referred to as detecting contact or movement related to the linear touch pad 106, whether the linear touch pad 106 or software or firmware associated with the linear touch pad 106 actually detects the contact or movement. For illustration purposes, a left direction 112 and a right direction 114 are referenced as being parallel to the axis 110. In some embodiments, the linear touch pad 106 is able to detect the direction in which a stylus is slid along the linear touch pad 106.

In addition to the linear touch pad 106, the digital camera 100 also includes an annular touch pad 120. It is noted that other embodiments of the digital camera 100 may include either the linear touch pad 106 or the annular touch pad 120. The annular touch pad 120 of FIG. 1 has an outer circumference 122 and an inner circumference 124, wherein the active portion of the annular touch pad 120 is located between the outer circumference 122 and the inner circumference 124. The annular touch pad 120 or software associated with the annular touch pad 120 detects contact with the annular touch pad and/or movement along the arc 126. As with the linear touch pad 106, the annular touch pad 120 will be referred to as detecting contact or movement related to the annular touch pad 120, whether the annular touch pad 120 or software or firmware associated with the annular touch pad 120 actually detects the contact or movement. As with the linear touch pad 106, the annular touch pad 120 is able to detect the direction of movement of a stylus on the annular touch pad 120. For illustration purposes, a clockwise direction 127 and a counter clockwise direction 128 are shown and extend along the arc 126.

The touch pads 106, 120 may be able to determine the location of a stylus, such as a finger, that has contacted the touch pads 106, 120. Thus, the touch pads 106, 120 may be able to determine if a stylus has tapped the touch pads 106, 120 and the location of the tap. Such a function is useful so that different locations of the touch pads 106, 120 may serve to activate different functions of the digital camera 100. Therefore, the touch pads 106, 120 may function as a plurality of different buttons. By detecting the location of contact on the touch pads 106, 120, the touch pads 106, 120 may be able to determine the velocity in which a stylus is slid along the touch pads 106, 120. With the above-described abilities, the touch pads 106, 120 are able to determine the location of contact by a stylus and the direction and velocity of movement of the stylus relative to the touch pads 106, 120.

The digital camera 100 also includes a display 130. The display 130 may display previously captured images and/or video clips stored in a memory device when the digital camera is in a first mode or a playback mode. The display 130 may also display images or scenes that may be captured by the digital camera 100. When images that may be captured are displayed on the display 130, the digital camera 100 is referred to as being in a second mode or a live view mode. Capturing a scene may be achieved by pressing a capture button 132. It is noted that other buttons and the like may be located on the digital camera 100, but they are not shown in FIG. 1. It is also noted that the digital camera 100 may capture video clips by use of the capture button 132 or other buttons and the captured video and images may be displayed on the display 132 as they are being captured.

Previously captured images and video clips may be stored on a memory or storage device located in or attached to the digital camera 100. As memory technology has improved, the memory devices have become capable of storing more images and video clips. As more images and video clips are stored in the memory devices, it has become difficult for a user to sort through the images and video clips. More specifically, conventional digital cameras do not have the controls necessary to conveniently sort through hundreds or thousands of images and video clips. The digital camera 100 described herein overcomes this problem by use of the touch pads 106, 120 and software associated with the touch pads 106, 120.

The images or video clips may be stored in some order within the memory device. For example, they may be stored in chronological order or alphabetical order. When the digital camera 100 is in the playback mode, these images and video clips are displayable on the display 130. When a user wants to view a different image, he or she generates an instruction for the digital camera 100 to display the next image or a previous image. When the commands are processed by the digital camera 100, the next or previous image in the memory device is displayed. As described in greater detail below, the instructions for displaying images are generated by the touch pads 106, 120. In addition, instructions for viewing video clips are generated by the touch pads 106, 120. As also described in greater detail below, the use of the touch pads 106, 120 enables a user to view images at any point in the order without having to cycle through all the stored images using the next and previous instructions.

Having described some of the components of the digital camera 100, the operation of the digital camera 100 will now be described. As briefly described above, the digital camera 100 detects contact of a stylus, such as a finger, on the touch pads 106, 120 and processes camera functions based on the contact. The contact may include pressing a section of a touch pad or sliding the stylus along a touch pad.

In some embodiments, the digital camera 100 detects the intent of a user based on the contact of the stylus to a touch pad and processes the functions based on the intent. For example a user may slide a finger along the linear touch pad 106 in a specific direction in order to have the digital camera perform a function. If the user continuously slides the finger in the same direction on the linear touch pad 106, the speed of the function may be increased because the user intends to speed up the function. Likewise, if the user continuously moves a finger along the annular touch pad 120, the speed of the function may increase.

In some embodiments, the speed at which a function is performed is determined by the speed in which a stylus is slid on a touch pad. For example, when a stylus is slid at a high rate of speed on a touch pad, the function is performed relatively fast. Likewise, when the stylus is slid along the touch pad at a slower speed, the function is performed slower.

In some embodiments, the touch pads 106, 120 are divided up into sections 134 as shown in FIG. 1. The sections 134 may be created by software associated with the touch pads 106, 120 wherein the software detects in which section the stylus has contacted. When the stylus is slid on the touch pads 106, 120 the digital camera 100 determines when the stylus passes from one-section to another. The speed at which the function is processed is based on the speed at which the stylus passes from one section to another. The use of the sections 134 enables the function to be processed incrementally by processing the function when the stylus moves from one section to another. One embodiment of the incremental processing of a function is for viewing images and video clips as described in greater detail below. Displayed images or video frames are changed when the stylus is moved from one section to another.

The above described contact with the touch pads 106, 120 will now be described with regard to the digital camera 100 operating in the playback mode. As mentioned above, when the digital camera 100 is in the first or playback mode, previously captured images or video may be displayed on the display 130. The digital camera 100 may be placed in the playback mode by a user pressing a button or the like located on the digital camera 100. The playback mode may also be entered by the user activating or otherwise contacting a portion of one of the touch pads 106, 120. When previously captured images are displayed on the display 130, different images may be viewed by contacting one of the touch pads 106, 120 or moving a stylus on one of the touch pads 106, 120 as described herein.

As also mentioned above, images and video clips may be stored in some order, such as alphabetic or chronologic order in the memory device. The digital camera 100 may generate instructions for a next or previous image or video clip to be displayed depending on the contact of a stylus on a touch pad. The touch pads 106, 120 detects movement of a stylus, such as a finger, on the touch pads 106, 120. Movement detected in the right direction 112 on the linear touch pad 106 or movement detected in the clockwise direction 127 on the annular touch pad 120 may cause the next image to be displayed. Likewise, movement detected in the left direction 114 on the linear touch pad 106 or the counter-clockwise direction 128 on the annular touch pad 120 may cause the previous image to be displayed.

The digital camera 100 may continually change the images displayed on the display 130 as the stylus is slid on one of the touch pads 106, 120. In one embodiment, as the stylus is slid in the right direction 112, next images in the order are displayed. For example, each time the stylus enters a new section of the linear touch pad 106, a next image may be displayed. Thus, the rate at which next images are displayed corresponds to the speed at which the stylus is moved on the linear touch pad 106. If the stylus is moved in the left direction 114, previous images are displayed. It follows that the rate at which previous images are displayed corresponds to the rate at which the stylus is slid on the linear touch pad 106 in the direction 114. The same is applicable to the annular touch pad 120.

In some embodiments, tapping the touch pads 106, 120 in preselected areas will achieve the result of displaying next and previous images. More specifically, the digital camera 100 detects the location of a tap on one of the touch pads 106, 120 and displays a next or previous image based on the location. In some embodiments, the camera may detect a continual motion of the stylus on one of the touch pads 106, 120. Based on the continual motion, the digital camera will speed the rate at which next or previous images are displayed. For example, if a stylus is continually moved in the right direction 112 or repeatedly moved in the right direction 112, the rate at which next images are displayed may increase.

In some embodiments, the storage device is temporarily mapped onto one or both of the touch pads 106, 120. For example, if the storage device has one hundred images, the touch pads 106, 120 may be portioned into one hundred sections. Contact with the a touch pad at the half way point causes the fiftieth image to be displayed. Likewise, contact at the one quarter location causes the twenty-fifth image to be displayed. It is noted that the touch pads 106, 120 do not necessarily need to be portioned into the exact number of images stored on the storage device. Rather the touch pads 106, 120 can be portioned into a preselected number of sections or a dividend of the number of images stored on the storage device. In such embodiments, the number of sections that the touch pads 106, 120 are portioned to is minimized. After an image is selected as described above, the touch pads 106, 120 may resume the function of generating next and previous instructions as described above. Thus, the user may skip to an image located toward the end of the order and then conveniently scan the images in that location.

With regard to video clips, portions of the video clips may be viewed by contacting the touch pads 106, 120. In some embodiments, the entire video clip may be temporarily mapped on a touch pad as described above with reference to the images stored in the storage device. Contact with a location on the touch pad will then display or play a corresponding location of the video clip. For example, a one minute video clip may be mapped onto the linear touch pad 106. Contacting the linear touch pad 106 at a location one quarter of its length from the left side will cause the display 130 to display or start playing the video clip at a location corresponding to fifteen seconds. A user may also view video clips frame by frame. For example, a still image of a video clip may be displayed. The user may advance the video clip frame by frame by moving a stylus from left to right on the linear touch pad 106 or clockwise on the annular touch pad 120. Likewise, the user may rewind or decrement the video clip by moving a stylus from right to left on the linear touch pad 106 or counter clockwise on the annular touch pad 120.

The rate that new images or video frames are displayed may be increased by repeating the contact with the touch pads 106, 120. For example, a user may slide a stylus in the right direction 112 on the linear touch pad 106 to increment a video frame. As the contact is repeated, every other or every third video frame may be displayed. With continued contact, the speed of the video will increase. For example, it may increase to every tenth or twelfth frame. The same may apply to contact with the annular touch pad 120. In a similar manner, still images may be displayed wherein continued contact with a touch pad cause every other image to be displayed. As the contact continues, the rate at which the images are displayed increases. It is noted that the rate of display may not necessarily increase. Rather, the gap between displayed images or frames may increase, which gives the impression of an increase in the display rate. Thus, the continued contact serves similar to a fast forward or fast reverse function. It is noted that the above described method of displaying images and video frames may also be used to display previous images and video frames. It is noted that the rate at which frames or images are displayed may simply be increased or decreased based on the speed of the stylus.

In some embodiments, the rate at which video frames are displayed is based on the speed in which the stylus is moved on a touch pad. When the stylus is moved fast, the video is sped up and when the stylus is moved slow, the video is slowed. This is applicable for forward and reverse viewing of video. It is noted that the video may not speed up, but rather, displayed frames may be skipped as described above.

The techniques described above may also be used for other camera functions. For example, when editing images, enhancements to the images may be performed by use of the touch pads 106, 120. Continued contact with the touch pads 106, 120 may increase the rate at which the enhancements are applied. Likewise, the speed at which enhancements are applied may be based on the speed at which the stylus is moved relative to the touch pad. One example of such a use is adjusting the brightness of an image. Contacting a touch pad once may increase or decrease the brightness a small amount. Continued contact with a touch pad will increase or decrease the brightness by greater amounts. Likewise, the rate at which the brightness is adjusted may be proportional to the speed at which the stylus is moved on a touch pad. Small incremental brightness adjustments may be achieved by moving the stylus slowly and larger adjustments may be made by increasing the speed of the stylus.

It is noted that the above-described camera functions may be used in the live mode and may be applicable to all camera settings, including, but not limited to, aperture size, exposure time, contrast, color balance, gain, exposure compensation, flash, zoom.

The above described use of the touch pads 106, 120 for control of camera functions may also be used in two directions. For example movement of a stylus in a first direction may increase a function, such as zoom or aperture. Movement of the stylus in the opposite direction may decrease the function.

The touch pads 106, 120 may also be used to rotate images. For example, when images are displayed on the display 130, a user may rotate the images by contacting a touch pad. In some embodiments, rotation is achieved by sliding a stylus on one of the touch pads 106, 130. Sliding the stylus along the linear touch pad 106 in the right direction 112 may rotate the image clockwise and sliding the stylus in the left direction 114 may rotate the image counter clockwise. With regard to the annular touch pad 120, sliding a stylus in the clockwise direction 127 may rotate an image clockwise and sliding a stylus in the counter clockwise direction 128 may rotate an image counter clockwise.

A specific contact with a touch pad may cause the image to rotate a preselected amount in a preselected direction. For example, if a stylus is slid in the clockwise direction 127 along the annular touch pad 120 at a velocity greater than a preselected velocity, the displayed image may rotate clockwise a preselected amount, such as ninety degrees. Likewise, if a stylus is slid in the counter clockwise direction 128 along the annular touch pad at a velocity greater than the preselected velocity, the displayed image may rotate a preselected amount, such as ninety degrees counter clockwise.

Figure 2:
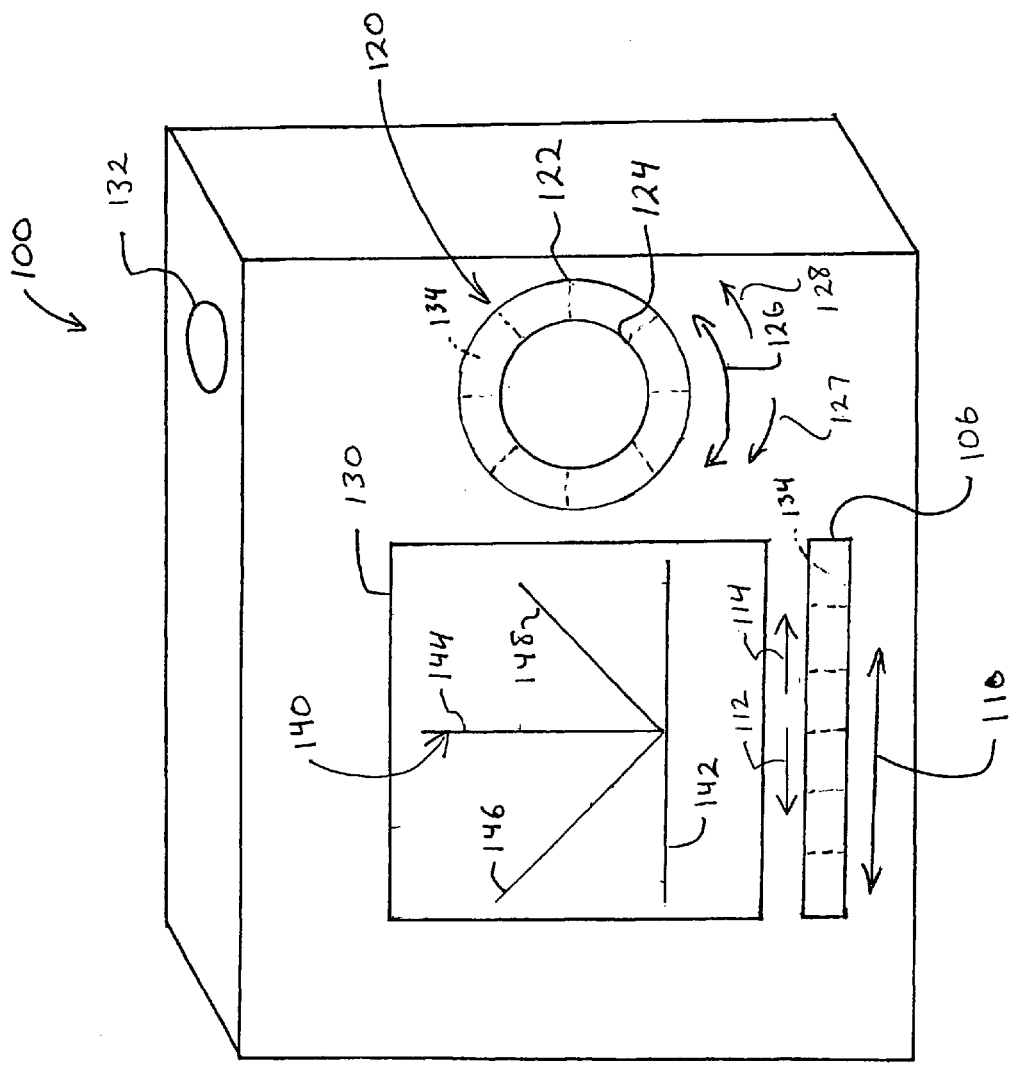
FIG. 2 is an embodiment of the digital camera of FIG. 1 with reference lines displayed on the display.

Referring to FIG. 2, in order to assist the user in aligning images, reference lines 140 may be displayed on the display 130 along with the images. In the embodiment of the digital camera 100 of FIG. 1 a horizontal reference line 142 extends horizontally. A vertical reference line 144 extends perpendicular to the horizontal reference line 142. A first bisect line 146 and a second bisect line 148 extend from the intersection of the horizontal reference line 142 and the vertical reference line 142 at forty-five degree angles. It is noted that other reference lines or arrangements may be displayed on the display 130.

The reference lines 140 may be used to align images. For example a user may align a horizon with the horizontal reference line 142. More specifically, a user may use the techniques described above to rotate an image so that it is aligned in a specific manner with the horizontal reference line 142. Poles or other vertical objects in an image may be aligned with the vertical reference line 144. In some embodiments the reference lines may be moved on the display 130 so as to better align them with features in an image.

In other embodiments, the reference lines 140 may be moved to angles selected by the user in addition to locations selected by the user. Once the angles and locations are selected, they may be maintained so that they may be used to align other images. Accordingly, a plurality of images may be rotated so that they all have the same alignment.

What is claimed is:

1. A method of rotating an image displayed on a display device, said method comprising displaying a reference line disposed at an angle selected by a user on the display; and moving a stylus relative to an annular touch pad located on said display device, wherein the amount of movement corresponds to the amount of rotation of said image.

2. The method of claim 1, wherein said image is rotated in a first direction when said stylus is moved in a first direction relative to said touch pad and wherein said image is rotated in a second direction when said stylus is moved in a second direction relative to said touch pad.

3. The method of claim 1 wherein said image is rotated a preselected amount if the speed of said stylus relative to said touch pad is greater than a preselected speed.

4. The method of claim 1 and further comprising displaying at least one axis line on said display.

5. The method of claim 1, further comprising:
rotating said image into a desired alignment with said reference line.

6. The method of claim 1, further comprising:
moving said reference line into a desired alignment with said image.

7. The method of claim 6, further comprising:
maintaining said desired alignment of said reference line; and
rotating at least one second image according to said desired alignment.

\* \* \* \* \*